United States Patent [19]
Curtis et al.

[11] Patent Number: 5,596,632
[45] Date of Patent: Jan. 21, 1997

[54] MESSAGE-BASED INTERFACE FOR PHONE FRAUD SYSTEM

[75] Inventors: Terrill J. Curtis; Jens L. Moller; Matthew L. Galetti, all of Colorado Springs, Colo.

[73] Assignee: MCI Communications Corporation, Washington, D.C.

[21] Appl. No.: 515,579

[22] Filed: Aug. 16, 1995

[51] Int. Cl.$^6$ .................................................. H04M 17/00
[52] U.S. Cl. ........................... 379/189; 379/32; 379/197; 379/138
[58] Field of Search .................................. 379/32, 33, 58, 379/59, 133, 113, 136, 135, 134, 196, 197, 189, 138; 340/825.32, 825.31, 825.3, 825.34

[56] References Cited

U.S. PATENT DOCUMENTS

| | | | |
|---|---|---|---|
| 4,782,516 | 11/1988 | Maybach | 379/189 |
| 5,335,278 | 8/1994 | Matchett | 340/825.31 |
| 5,351,290 | 9/1994 | Naeini | 379/189 |
| 5,392,335 | 2/1995 | Reeder | 379/189 |
| 5,428,795 | 6/1995 | Johnson | 340/825.31 |
| 5,463,681 | 10/1995 | Vaios | 379/189 |

*Primary Examiner*—Krista M. Zele
*Assistant Examiner*—Thomas F. Presson

[57] ABSTRACT

Telephone fraud is monitored by effectively interfacing workstations with a fraud data server. Multiple customers may have their respective workstations coupled to the data server with attendant limited access to ensure security. A workstation manager and alarm manager cooperate with a management system database to process login and alarm detail requests from the various workstations. The managers are coupled to a single shared memory. The interface between the workstations and the fraud data server is by means of a message-based interface which standardizes the various functions of the workstation.

7 Claims, 7 Drawing Sheets

| EXAMPLE 1: INBOUND 800 MONITORING PLAN ||||
|---|---|---|---|
| GENERAL INFORMATION ||||
| THE CUSTOMER HAS A TOTAL OF 500 INBOUND 800 NUMBERS OF WHICH 300 TERMINATE ON BUSINESS LINES AND 200 TERMINATE ON A DAL. THE CUSTOMER MAY SPECIFY A PLAN THAT INCLUDES 25 NUMBERS THAT TERMINATE ON A DAL. ||||
| PARAMETERS ||||
| DAY OF WEEK | TIME OF DAY | THRESHOLDS ||
| MONDAY - FRIDAY | 8:00 - 17:59 (BUSINESS) | SHORT CALLS: 18 SECONDS/50 TOTAL ||
| | | LONG CALLS: 120 MINUTES/10 TOTAL ||
| | | TOTAL MINUTES: 2000 MINUTES ||
| | 18:00 - 7:59 (NON-BUSINESS) | SHORT CALLS: 18 SECONDS/ 10 TOTAL ||
| | | LONG CALLS: 120 MINUTES/3 TOTAL ||
| | | TOTAL MINUTES: 500 MINUTES ||
| SATURDAY - SUNDAY | 7:00 - 19:59 (BUSINESS) | SHORT CALLS: 18 SECONDS/30 TOTAL ||
| | | LONG CALLS: 120 MINUTES/10 TOTAL ||
| | | TOTAL MINUTES: 300 MINUTES ||
| | 20:00 - 6:59 (NON - BUSINESS) | SHORT CALLS: 18 SECONDS/30 TOTAL ||
| | | LONG CALLS: 120 MINUTES/3 TOTAL ||
| | | TOTAL MINUTES: 120 MINUTES ||
| RISK FACTORS ||||
| NPX-NXX | RISK | EXPLANATION ||
| 202-887 | 1.5 | THE CUSTOMER KNOWS THAT IT WANTS TO PAY PARTICULAR ATTENTION TO CALLS FORM CERTAIN HIGH-RISK NPA-NXXS, SO IT ASSIGNED RISK FACTORS TO THEM (NOTE: ALL OTHER NPA-NXXS WOULD HAVE A DEFAULT RISK FACTOR OF 1.0) ||
| 202-955 | 3.0 | ||
| 301-756 | 2.5 | ||
| SUSPECT NUMBERS ||||
| 033-719-555-1212   033-701-654-4321   044.2.126.1278 + MCI GLOBAL LIST 033-202-556-1200   033-512-555-1234   122.57.3.157.1100 (FOREIGN NUMBERS) ||||
| SAMPLE ALARMS ||||
| TYPE | CAUSE |||
| LONG (L) | 4 CALLS OVER 120 MINUTES IN DURATION FROM LOW-RISK NPA-NXXS ON A TUESDAY DURING NON-BUSINESS HOURS |||
| SHORT (S) | 21 CALLS OF LESS THAN 18 SECONDS IN DURATION FROM THE 301-756 EXCHANGE DURING BUSINESS HOURS ON A MONDAY |||
| CUMULATIVE (M) | 121 CUMULATIVE MINUTES ON A SATURDAY DURING NON-BUSINESS HOURS |||
| SUSPECT (A) | CALL WAS DETECTED FROM 033-719-555-1212 |||

*FIG. 4*

| EXAMPLE 2: OUTBOUND INTERNATIONAL MONITORING PLAN |||
|---|---|---|
| GENERAL INFORMATION |||
| THE CUSTOMER MAY SPECIFY A PLAN THAT INCLUDES 25 DALS LOCATED AT FACILITY X. |||
| PARAMETERS |||
| DAY OF WEEK | TIME OF DAY | THRESHOLDS |
| MONDAY - FRIDAY | 8:00 - 16:59 (BUSINESS) | LONG CALLS: 40 MINUTES/5 TOTAL |
| | | TOTAL CALLS: 300 |
| | | TOTAL MINUTES: 240 MINUTES |
| | 17:00 - 7:59 (NON-BUSINESS) | LONG CALLS: 40 MINUTES/3 TOTAL |
| | | TOTAL CALLS: 100 |
| | | TOTAL MINUTES: 120 MINUTES |
| SATURDAY - SUNDAY | 9:00 - 15:59 (BUSINESS) | LONG CALLS: 40 MINUTES/3 TOTAL |
| | | TOTAL CALLS: 100 |
| | | TOTAL MINUTES: 120 MINUTES |
| | 16:00 - 8:59 (NON - BUSINESS) | LONG CALLS: 40 MINUTES/3 TOTAL |
| | | TOTAL CALLS: 10 |
| | | TOTAL MINUTES: 60 MINUTES |
| RISK FACTORS |||
| COUNTRY | RISK | EXPLANATION |
| PAKISTAN | 3.0 | THE CUSTOMER KNOWS THAT IT WANTS TO LIMIT THE CALLS TO CERTAIN FOREIGN COUNTRIES, SO IT ASSIGNED RISK FACTORS TO THEM. (NOTE: ALL OTHER COUNTRIES WOULD HAVE A DEFAULT RISK FACTOR OF 1.0) |
| INDIA | 5.0 | |
| COLUMBIA | 2.0 | |
| SUSPECT NUMBERS |||
| 033-719-555-2121 | 033-512-555-1234 | + MCI GLOBAL LIST |
| SAMPLE ALARMS |||
| TYPE | CAUSE ||
| NUMBER (N) TOTAL CALLS (T) | 30 CALLS ARE TO COLUMBIA AND 14 CALLS ARE TO PAKISTAN (A TOTAL OF 102 RISK-ADJUSTED CALLS) DURING NON-BUSINESS HOURS ||
| LONG (L) | TWO CALLS OVER 40 MINUTES IN LENGTH TO COLUMBIA ON A SATURDAY DURING NON-BUSINESS HOURS (A TOTAL OF 4 RISK-ADJUSTED CALLS) ||
| CUMULATIVE (M) | TWO 30-MINUTE CALLS TO INDIA ON A WEDNESDAY DURING BUSINESS HOURS (A TOTAL OF 300 RISK-ADJUSTED MINUTES) ||
| SUSPECT (A) | CALL WAS DETECTED FROM 033-719-555-2121 ||

MESSAGE-BASED INTERFACE FOR PHONE FRAUD SYSTEM

RELATED APPLICATIONS

This application relates to co-pending U.S. patent application Ser. No. 08/577,888, entitled "Telephone Fraud Detection System" (Attorney Docket: 1643/400).

FIELD OF THE INVENTION

The present invention relates to telephone systems, and more particularly to a message based workstation-data server interface for a fraud detection and monitoring system.

BACKGROUND OF THE INVENTION

Phone fraud is an ever-increasing problem in this country. To combat the problem, long-distance carriers are developing products to detect fraud in its early stages. In recent years, customer liability for the unauthorized use of customer premise equipment (CPE) and calling card numbers to make long-distance calls is estimated at over $2 billion annually. In some cases, a customer may incur charges in excess of $100,000 over the course of one weekend. To maintain good relations with the public, long distance carriers, including MCI, often assume the majority of the liability for these calls. As a result, both carriers and customers are increasingly seeking measures to reduce the occurrence of phone fraud. Phone fraud consists of two types: CPE related and calling card.

CPE-related fraud occurs when a third party gains illegal access to a customer's PBX (private branch exchange) and steals the dial tone to make outgoing calls. This is a particular problem with hackers dialing 800 (toll-free) numbers and then gaining access to an outbound trunk. Outgoing calls are charged to the CPE owner regardless of the origination of the call. From a financial standpoint, the worst and most costly form of abuse involves international calls.

At the present time, fraud analysis is typically done by manually reviewing call data records, after an initial data sorting, to detect patterns indicative of fraud. However, as will be appreciated, this is a laborious and time-consuming process which results in long delays between the actual occurrence of fraud and the manual review and detection thereof. In the previously identified related applications, systems have been developed for automating the detection of fraud alarms and storing their details in a database accessible by workstations.

Co-pending U.S. patent application Ser. No. 08/577,888 (Attorney Docket: 1643/400) is directed to a system referred to as MCI Detect™ that provides long distance carriers such as MCI with an automated (and improved) method of detecting CPE fraud. Both applications are incorporated by reference herein. For explanatory purposes, the front end system directed to MCI Detect will now be discussed. The present invention, per se, is discussed in the Section entitled "The Workstation Interface."

CPE fraud is suspected when an unusual calling pattern is detected, such as the following:

Inbound 800 number calls (hereinafter referred to as inbound 800);

Outbound international calls (hereinafter referred to as outbound international);

Numerous short duration calls which may indicate that hackers are attempting entry.

Two types of non-residential calls that are most susceptible to fraud are monitored:

Excessively long calls which may indicate that hackers are using inbound trunks to make outbound calls;

An unusual number of calls to foreign countries;

An unusual number of calls during non-business hours.

Fraud may also be suspected when calls originate from prisons, pay phones, hotels, hospitals, etc. The call detail records (CDRs) associated with each call contain information digits which provide this type of information. Calls originating from certain dialing areas, such as Manhattan, may also be cause for concern. NOTE: A dialing area is known as a Numbering Plan Area—Network Number Exchange (NPA-NXX).

Past experience with fraud also reveals suspect numbers which may be specific phone numbers (ANIs or Automatic Number Identifications) or dedicated access lines (DALs). Both an ANI and a DAL can be tracked to a specific home or business. Prepared with information about how to detect CPE-related fraud, MCI was able to determine which data to collect in order to develop monitoring plans for its customers. For calls to specific 800 numbers or from certain ANIs or DALs, MCI collects the following:

Total number of short-duration calls

Total number of long-duration calls

Total number of calls of any type

Total number of cumulative minutes from any type of call.

MCI Detect keeps count of the number of calls in each category over previously defined time periods such as during non-business hours on a weekend. Customers may specify what is considered to be a long or short call, or too many calls. The maximum allowable amount in any category is a threshold. Exceeding a threshold results in an alarm.

MCI Detect also permits customers to associate a risk with certain types of calls. For inbound 800 calls, risk factors may be assigned to calls from specific NPA-NXXs, information digits, and countries. For outbound international calls, the risk may be assigned to calls to specific countries only. When a risk is associated with a call, the statistic for that call is multiplied by the assigned risk factor (any number between 1.0 and 100.0). For example, if an outbound call to Cuba is assigned a risk of 2.0, then such a call is counted twice. In this way, a threshold is exceeded more quickly. It does not mean, however, that this call will automatically generate an alarm.

MCI also maintains a global list of suspect numbers so that it can monitor calls from specific numbers (ANIs or DALs) where fraud has been detected in the past. Customers may modify this list to suit their purposes. When a call from a suspect number is detected, an alarm is immediately generated regardless of the current totals in relevant monitoring categories.

The purpose behind compiling so many statistics is that customers may combine them in a variety of ways to create a truly customized monitoring plan.

The first component for fraud control is the switched network used by MCI to provide long distance services to its customers. Switching is the ability to route calls to different locations within the public phone network on a call-by-call basis rather than limiting transmission between predetermined fixed points. For example, a call from New York to Los Angeles may be routed through Chicago in one instance and through Atlanta and Denver in another. At each point in the network where lines converge, a switch is in place. The switch makes, breaks, or changes connections among the phone circuits in order route calls to their destination.

Co-located with every switch are computer systems, adjunct processors (APs), which assist in loading billing information and software into the switch. MCI's billing software, Traffic 2000 (T2000), also acts as a screening device by examining the detailed information (call detail records [CDRs]) associated with each call. Only relevant CDRs—non-residential inbound 800 calls and outbound international calls—are sent to MCI Detect. This prevents the fraud data system from becoming overwhelmed with data.

MCI Detect accepts the CDRs, immediately analyzes the call traffic, and keeps a running total of the counts (for example, number of short-duration calls) and thresholds for each monitoring plan stored in its database. Each monitoring plan is a set of parameters which govern how fraud will be detected for a specific type of call. MCI has developed several generic plans, but customers may also develop their own plans.

Each monitoring plan has three features:

Thresholds

Risk factors

Suspect numbers.

A threshold is a number which, when exceeded, generates an alarm in MCI Detect indicating possible fraud. For example, if a customer indicates that it should receive no more than 1000 calls to its 800 number on any given business day, then the number "1000" is a threshold, and the 1001st call will generate an alarm. Thresholds may be specified for the time of day and/or the day of the week. Furthermore, a threshold may be applied to each category for which MCI Detect keeps counts, including the number of short-duration calls, long-duration calls, and cumulative minutes.

As described previously, risk factors and suspect numbers help to determine the likelihood of fraud based on the assumption that some types of calls more clearly indicate fraud than others. For example, a call from a high-risk dialing area may be assigned a weight of 3.0. Each time such a call is recorded, relevant counts are multiplied by a factor of 3 and thresholds are exceeded more quickly. The detection of a suspect number immediately triggers an alarm in MCI Detect. It is not necessary to apply weights to these numbers.

Every MCI commercial customer is automatically assigned to a Universal Plan initially. Customized plan data is later entered by MCI representatives. Inbound and outbound thresholds are provided in separate plans; therefore, a customer can have both an inbound plan and an outbound plan active simultaneously. (Table 1 and Table 2 in FIGS. 5 and 6 show two examples of customer monitoring plans.)

When an alarm is generated by MCI Detect, it is also prioritized. The priority is a multiple of the number of times a threshold has been exceeded. For example, if the threshold was 10 and the relevant count has reached 50, then the priority of the alarm is 5 (50÷10).

Each alarm is available to an MCI fraud analyst via an MCI Detect Workstation. The workstation is a PC with access to a Fraud Data Server and retrieves the next available alarm of the highest priority. The analyst investigates the alarm data and, if fraud is suspected, notifies the customer and suggests appropriate actions to stop the fraud.

Based upon both MCI's and the customer's experiences with fraud, the customer's monitoring plan(s) may be modified with a new set of parameters or suspect numbers. This fine tuning is needed to more accurately detect fraud and to prevent false alarms.

Since the elapsed time between the completion of a call and the generation of an alarm by MCI Detect is 15 minutes or less, a significant improvement has been made over the 3–4 days required previously. MCI plans to reduce this time further to the point where fraud is detected while the call is in progress. Detecting fraud in progress permits actions to limit its impact, such as shutting down a DAL, to be taken as quickly as possible. In addition to changing the way that calls are processed at the switch level, in-progress detection requires effective calling statistics and a complete and current list of suspect numbers.

In maximizing the flexibility of customer monitoring plans, MCI Detect both minimizes false alarms and provides advantages over current competing products. The features that put MCI Detect above the competition are the following:

The flexibility to specify the ANIs and DALs that will be monitored and the monitoring thresholds and parameters for each.

MCI Detect's timely detection and notification of 15 minutes or less.

Calls to all foreign countries are monitored, not just a subset consisting of high-fraud countries.

Risk factors are applied to NPA-NXXs, information digits, and specific countries, which minimizes false alarms and also provides early notification of abnormal calling patterns.

Customers will have the option of specifying any of the following media for alarm notification: telephone, MCI Mail™, fax, pager Integrated Network Management Services (INMS), or Integrated Customer Workstation (ICW).

To increase customer involvement in fraud detection, MCI will allow MCI customers to monitor their own inbound 800 and outbound international traffic. Using MCI Detect directly, customers may create, modify, and delete monitoring plans and view alarms.

BRIEF DESCRIPTION OF THE INVENTION

Telephone fraud is monitored by effectively interfacing workstations with a fraud data server. Multiple customers may have their respective workstations coupled to the data server with attendant limited access to ensure security. A workstation manager and alarm manager cooperate with a Sybase database to process login and alarm detail requests from the various workstations. The managers are coupled to a single shared memory. The interface between the workstations and the fraud data server is by means of a message-based interface which standardizes the various functions of the workstation.

BRIEF DESCRIPTION OF THE FIGURES

The above-mentioned objects and advantages of the present invention will be more clearly understood when considered in conjunction with the accompanying drawings, in which:

FIGS. 4 and 5 are examples of monitoring plans that include various parameters for detecting fraud.

DETAILED DESCRIPTION OF THE INVENTION

The following is a glossary of abbrevintions referred to herein.

Glossary of Abbreviations

ANI Automatic Number Identifications
AP Adjunct Processors
CDR Call Detail Records
CPE Customer Premise Equipment
DAL Dedicated Access Lines
FCD Fraud Communication Distributor
FCG Fraud Communications Gateway
FDS Fraud Data Server
FP Fraud Parser
ICW Integrated Customer Workstation
INMS Integrated Network Management Services
NPA-NXX Numbering Plan Area—Network Number Exchange
PBX Private Branch Exchange
TM Threshold Manager.

Figure 1:
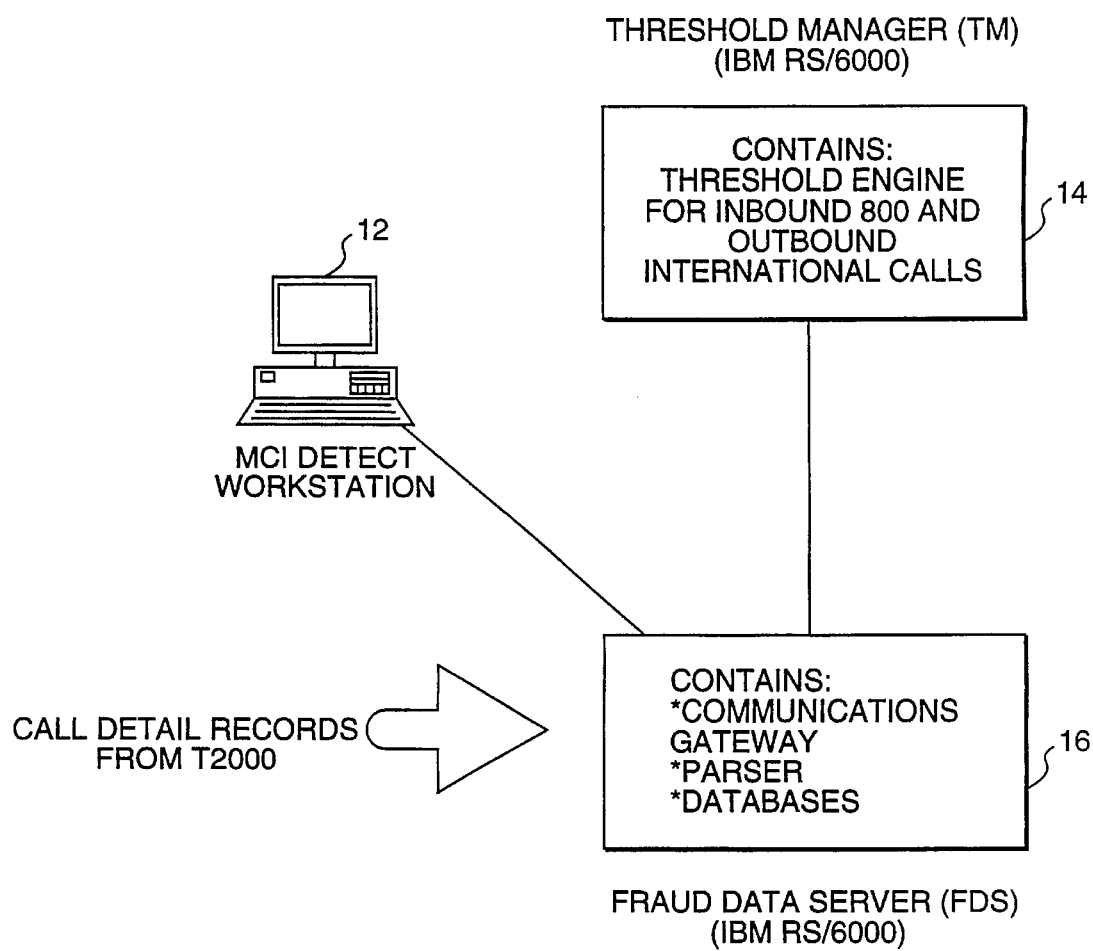
FIG. 1 is an overview of a fraud detection system, in block diagram form, that includes the workstation and fraud data server interface that specifically form the present invention.

Referring to FIG. 1, the overall fraud system for the MCI Detect architecture 10 consists of three basic systems:

Workstation 12

MCI Detect Threshold Manager (TM) 14

Fraud Data Server 16.

Each system is resident on a separate computer, and the software is unique to the local computer platform.

The message based workstation-fraud data server interface, including workstation 12 and server 16, constitutes the present invention, per se. The detailed description for this interface is specifically dealt with in the section headed "The Workstation Interface". However, to appreciate the environment of the subcombination invention, the following will describe the overall system operation for MCI Detect, as indicated in FIGS. 2 and 3.

Figure 2:
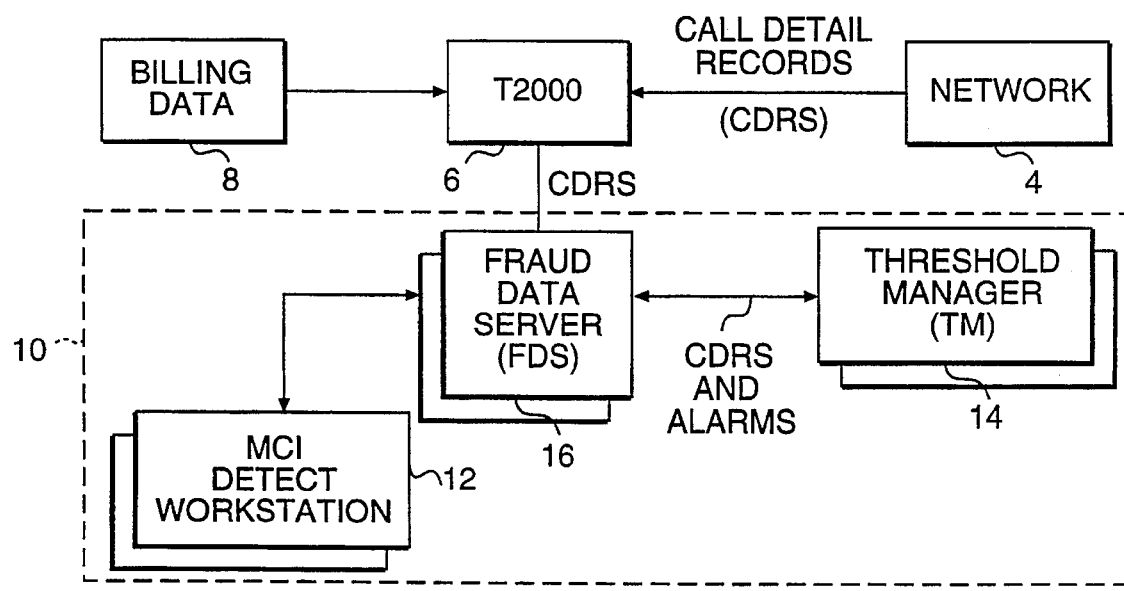
FIG. 2 is a block diagram of the system architecture for a fraud monitoring system, indicating greater detail than that shown in FIG. 1, and including the present invention.
Figure 3:
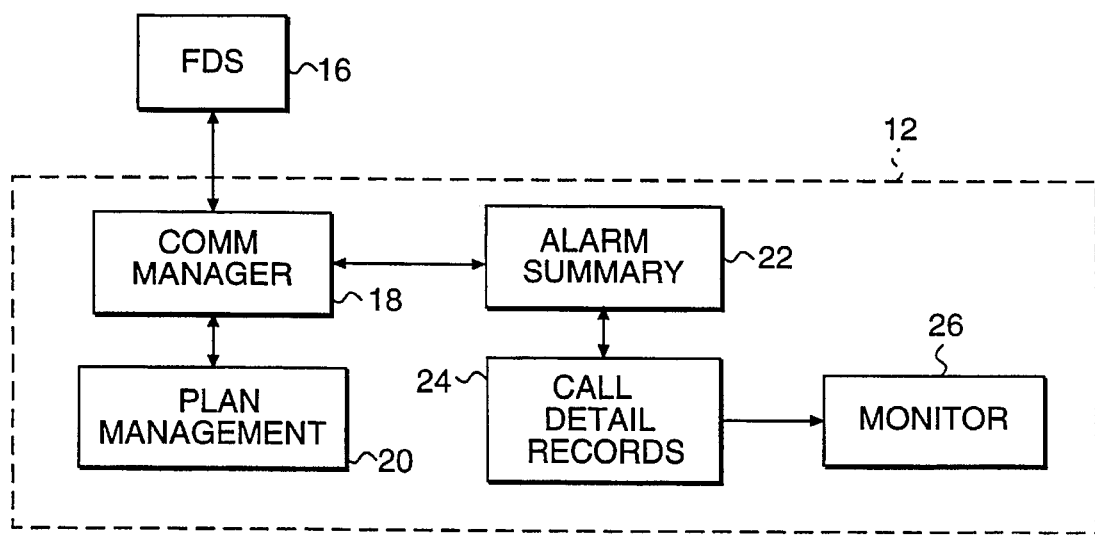
FIG. 3 is a block diagram of the workstation, as shown in FIG. 2.

Referring to FIG. 2, the architecture of the fraud system is shown in greater detail. The MCI network 4 generates call detail records (CDRs) which are input to an IBM-based computer system, indicated in block 6 as a T2000 (Traffic 2000). The system stores CDRs generated by the network 4. The T2000 system conventionally processes billing data, as indicated by reference numeral 8. The CDRs and billing data are retained in the T2000 for a period of time normally required to conduct fraud analysis. Typically, this would be for a period of 24 hours. The components 4, 6 and 8, employed by MCI Detect 10, constitute prior art.

With continued reference to FIG. 1, the output of the T2000 can provide call records including CDRs and billing data to the input of the MCI Detect system 10, and more particularly to a fraud data server (FDS) 16. The server is of conventional design and includes a buffer for recently retrieved call records which have been obtained from the T2000. The FDS provides call records to a threshold manager (TM) which processes the call records by reviewing the fields thereof and comparing these fields with established thresholds. When thresholds are exceeded, they indicate the possible occurrence of fraud.

Alarms are generated by the threshold manager 14 when such thresholds are exceeded. The alarms are transmitted to the FDS 16 that subsequently communicates the alarms to the workstation 12. The workstation also has access to the call records buffered in the FDS 16 so that an analyst at MCI, or an analyst at the network customer site, may have access to the necessary information to finally determine the occurrence of fraud. Since the FDS normally only buffers previously recently retrieved records, the workstation 12 may obtain older call records by querying the T2000.

The workstation 12 is preferably a PC workstation operating with an OS/2 operating system. FIG. 3 indicates the workstation 12 in greater detail. The workstation communicates bidirectionally with the FDS 16, the latter keeping track of updated alarm conditions fed back from the TM 14. The FDS produces alarm summaries from the alarm data fed back from the TM 14. The communications manager 18 provides alarm summary information packets to other objects of the workstation. In FIG. 3, the presence of recent actual alarm summaries, tabulatable on a priority basis, is indicated by object 22. Call detail records, as indicated by workstation object 24, are presented in graphical interface format to an analyst who can change the status of a particular alarm situation, as well as various status conditions. These changes are communicated to the FDS 16 by virtue of a communications path back through the alarm summary object 22 and the communications manager 18. From time to time, it may be necessary to change the thresholds of the TM 14. Threshold conditions vary for different accounts, according to preselected sets of parameters, referred to as plan management, and indicated in FIG. 3 by object 20. The parameters are shown in various examples in FIGS. 5 and 6.

The Workstation

Each workstation 12 may be an IBM PS/2 (486-based) personal computer running OS/2 version 2.1 or later. IBM's Presentation Manager™ provides the graphical user interface. The workstation communicates (via TCP/IP Protocol) with the Fraud Data Server 16 to extract alarm and plan data as previously mentioned. Up to 50 analysts may log onto MCI Detect workstations at one time. The estimated workload per workstation is 100 alarm resolution attempts per 24 hours. Its detailed operation is dealt with in the section headed "Workstation Interface".

MCI Detect Threshold Manager

Figure 6:
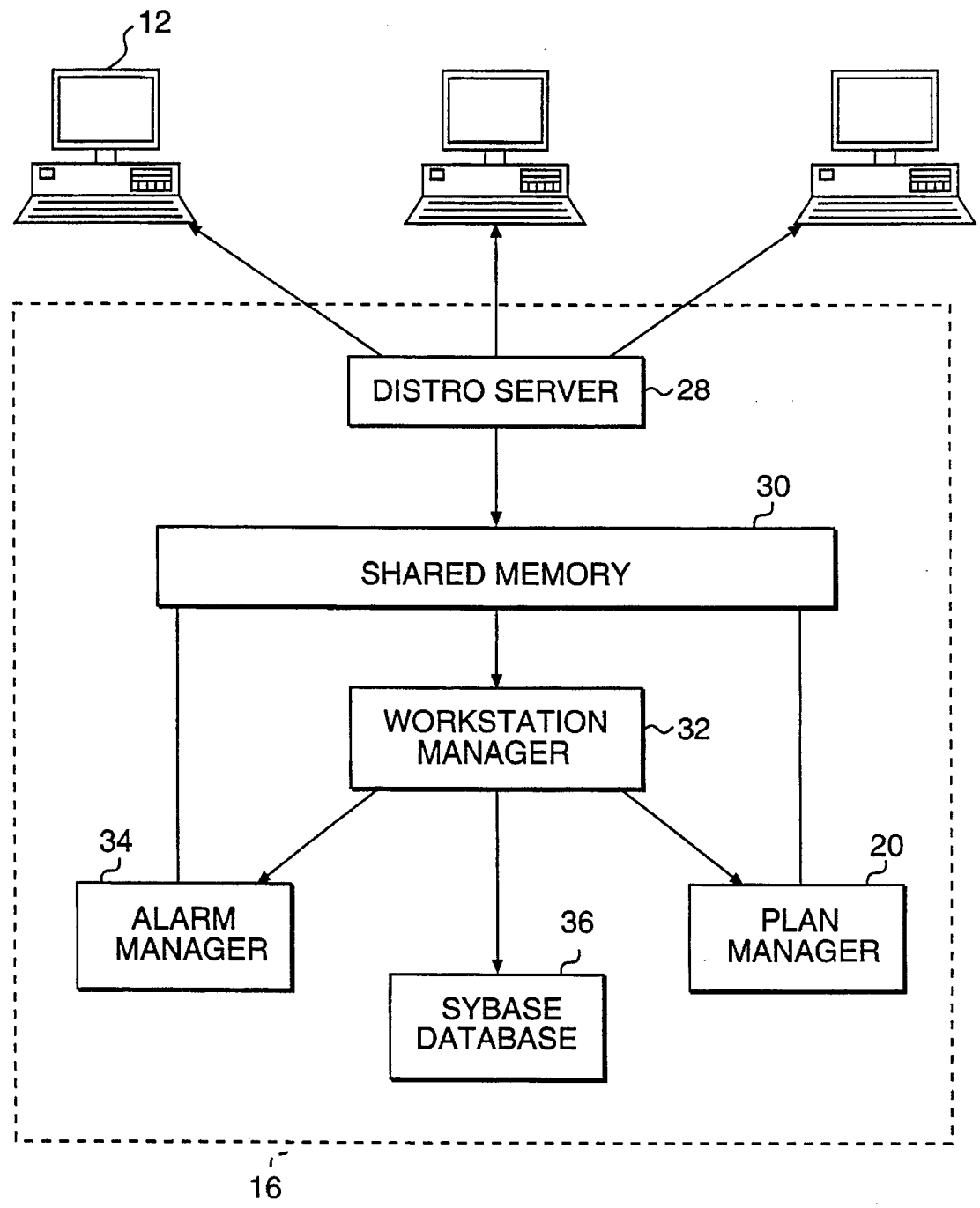
FIG. 6 is a basic block diagram of the architecture involved in the present invention.

The MCI Detect Threshold Manager provides real-time threshold analysis (that is, it continuously monitors for plan thresholds that have been exceeded) using algorithms (for example, number of short-duration inbound 800 calls). Examples are indicated in FIGS. 5 and 6. It receives call detail records from the Fraud Data Server 16 and returns alarms which may be retrieved and examined using a workstation. The threshold manager resides on an IBM RS/6000 computer running the AIX operation system.

Fraud Data Server

The workstation 12 interacts with the Fraud Data Server 16 to obtain current and historical fraud-related data, including CDRs, thresholds and other plan data, and alarms. See the following section, "Workstation Interface", for more details on the inventive interface.

The Fraud Data Server system consists of four major functional systems:

Fraud Communications Gateway (FCG)—acts as the interface with external data systems and eliminates unwanted CDRs from entering the data server. This interface allows communication protocols to be changed without affecting the rest of the fraud data systems.

Fraud Parser (FP)—reformats CDRs for processing and passes the records to the threshold manager.

Fraud Data Server (FDS)—manages databases of current and archived alarm data, customer plans, and other miscellaneous data.

Fraud Communication Distributor (FCD)—provides the data server with the ability to communicate with multiple fraud workstations.

Alarms and call information are sent to the fraud workstations via this interface.

The Fraud Data Server, in a preferred embodiment, resides on a separate IBM RS/6000 computer running under the AIX operating system and using the SYBASE relational database management system. Alternatively, the ORACLE database system may be used.

The Workstation Interface

The particular innovative subcombination, contributed to the overall fraud system discussed above, is architecturally depicted in FIG. 7. The various workstations 12 are seen to communicate with the fraud data server 16, the latter preferably being an IBM RS/6000 processor. As previously mentioned, each workstation 12 may be a PC, such as the IBM PS/2.

In addition to being able to display processed data, the workstation builds a message that is processed by the fraud data server 16. Communication between the workstation and the server 16 is by means of a conventional data transport protocol (TCP/IP).

The front end of the fraud data server includes a distribution server Distro Server 28, which is actually a conventional server process functioning as a communications manager with the interfacing workstations 12. The fraud data server 16 has a shared memory 30, which communicates at its input with an output of the Distro Server 28. The output of the shared memory is shared by a number of processes or managers relating to the fraud monitoring system previously discussed. These include an alarm manager 34 and a plan manager 20. The shared memory also interfaces with the input of a workstation manager 32.

The Distro Server 28 monitors the TCP/IP port for messages created by the workstations. The Distro Server stores a table that determines which of the managers are to communicate with a particular workstation. Each workstation, when communicating with the Distro Server, builds a message including a header. The header includes a workstation identification which is returned by the shared memory with any response to the workstation, through the Distro Server 28.

Figure 7:
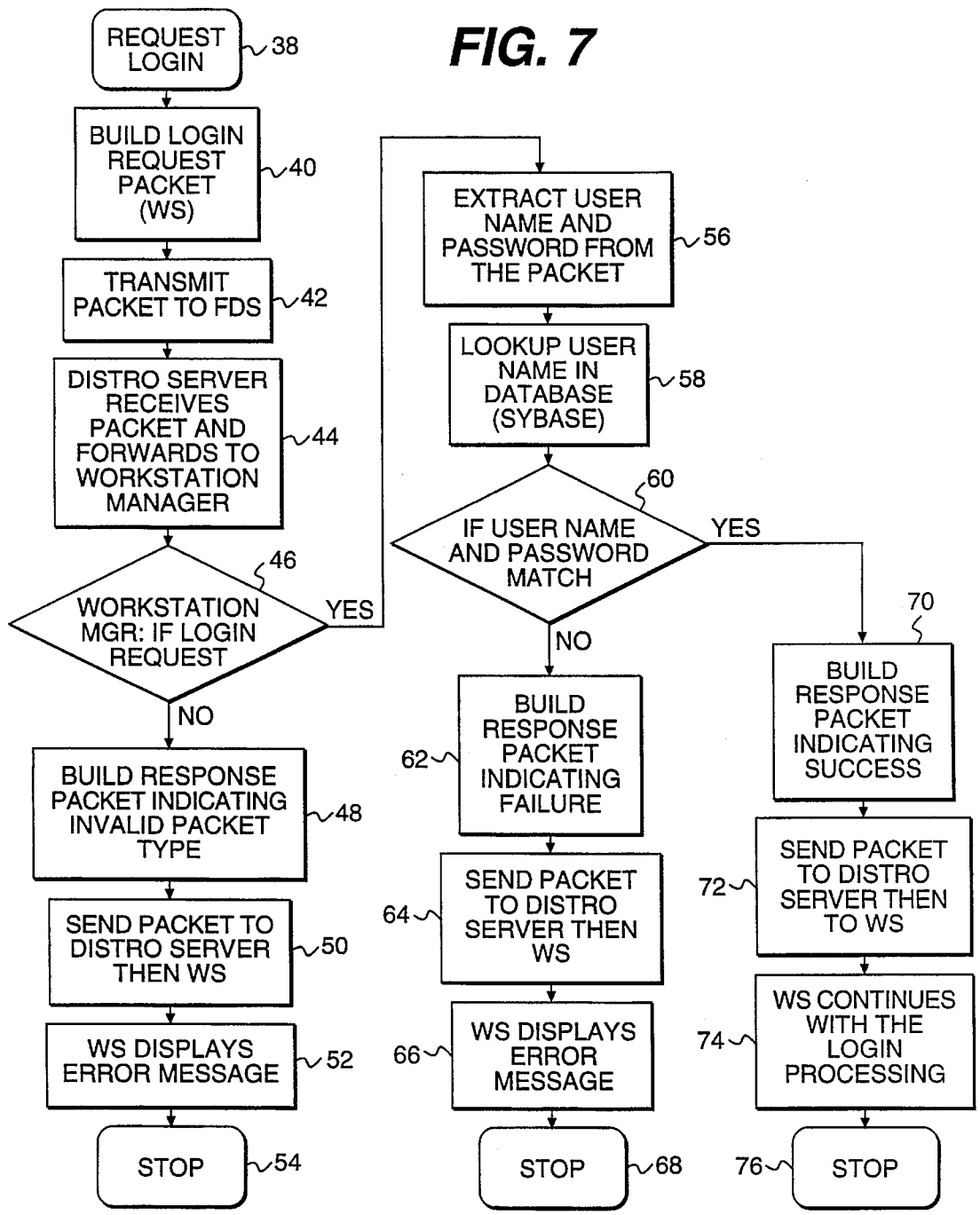
FIG. 7 is a process flow diagram of a simple login procedure, as employed by a workstation of the present invention.

The shared memory 30 serves as a buffer for messages being sent back and forth between the workstations and the various managers illustrated in FIG. 7. These managers then act as an intermediary in the exchange of data with the Sybase database 36.

In order to obtain a better understanding of how the present invention operates, several examples will be discussed. The first will be a login procedure initiated by a workstation 12. The workstation will build a message containing user identification and encrypted password which will allow the particular workstation indirect access to the database 36. The workstation then has restricted access to the database, so that data security may be maintained.

The following table gives a simplified structure of a message, as employed in the present invention.

| HEADER | | |
|---|---|---|
| FW_Ident = | | 1 |
| FW_Func = | | 100 |
| FW_FieldNum = | | 2 |
| FW_Records = | | 1 |
| FW_WSNum = | | 1 |
| FIELD DEF. | | |
| Record 1 | Name = | User |
| | Type = | C |
| | Length = | 3 |
| Record 2 | Name = | Password |
| | Type = | C |
| | Length = | 15 |
| Data | | |
| User | | |
| Password | | |
| . | | |
| . | | |
| . | | |

Each message includes three major portions. The first is the header which establishes a number of parameters for the remainder of the message. The second major section is a definition of the fields by name, type and length. A final portion of a message is the actual data defined by the field definitions.

In further explanation, when a workstation requests login, it begins to build a message header, a first element of which is identified in the table as "FW_Ident=1" which signifies that this is the first login request by the particular workstation. The request number will be returned by a response message. The next element is indicated as "FW_Func=100" which is a function code corresponding to the login function. The following element, "FW_FieldNum=2" indicates how many fields will exist for the request being built by the workstation. During login, the fields will correspond to user identification and password. The following element is "FW_Records=1" which indicates that each record will include the two fields just mentioned. For a login request, the fields are user identification and password. The workstation also inserts its workstation number, for example, 1, as indicated by the last header element, "FW_WSNum=1".

The table also indicates the field definitions for a login message. Thus, in the illustrated example, the name field includes the user's name "User". Characters are used for the name field. Another field, using characters, defines its type. The length of the field is typically 3 characters. The first three fields define a first record.

A second record includes a name field which corresponds to a user's password. Again, characters define the type of field and the password field length is typically 15 characters. The message is then followed by data including the user name and password.

Figure 8:
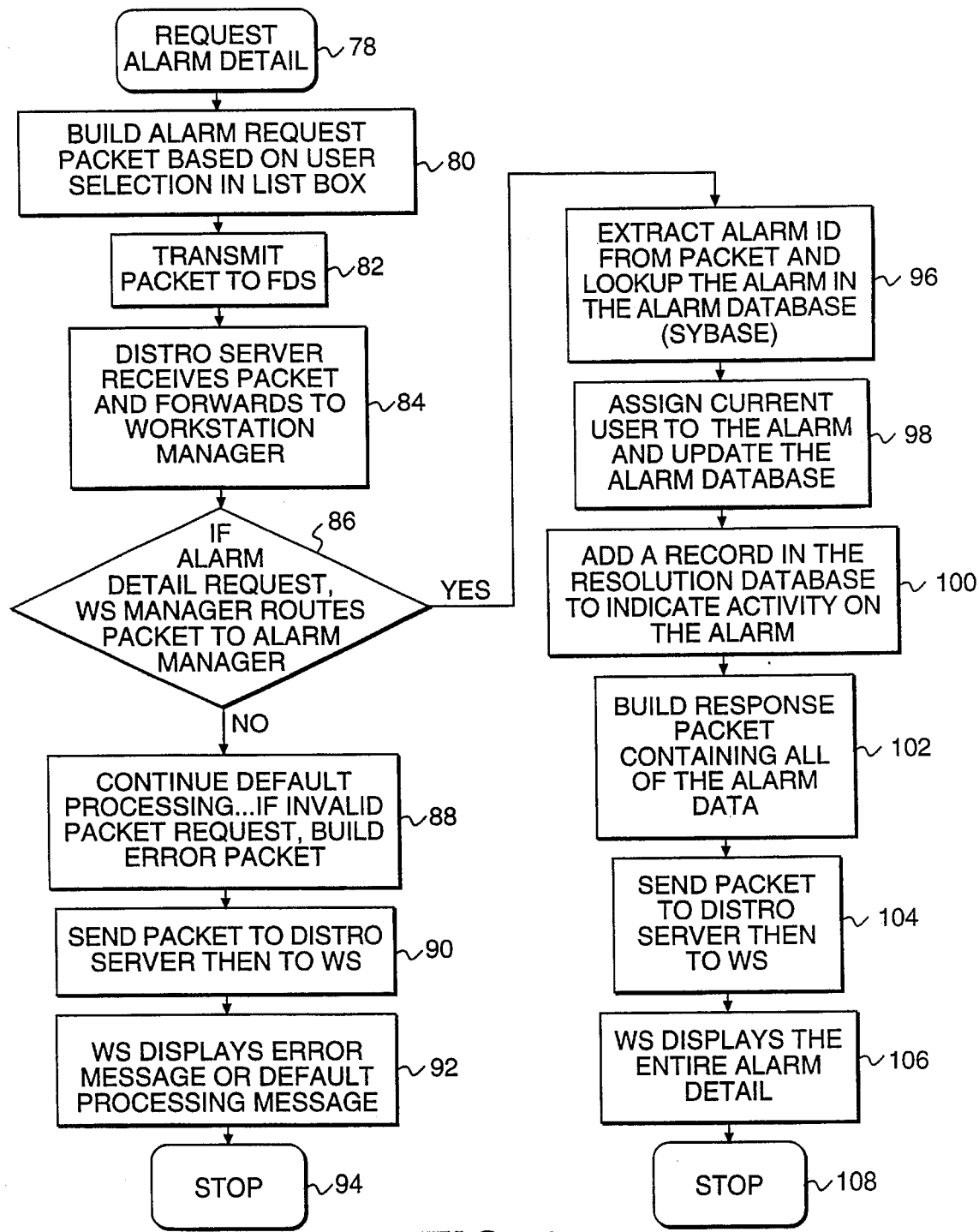
FIG. 8 is a basic process flow diagram of a request for alarm condition details to be displayed at the workstation of the present invention.

FIG. 8 is a process flow diagram of a simple login procedure. The login procedure occurs between a workstation and a Distro Server. Step 38 indicates the user's request to login, at the user's workstation. At step 40, the workstation builds a login request packet in the nature of a completed message, as just discussed in connection with the table. More particularly, the user name and password is extracted from the login window of the workstation and the communications packet is created. The following message building steps are accomplished:

- The FW_Ident field in the header is populated with the next available communications identifier. This number is incremented to assure the next request is unique.
- The FW_Func field in the header is populated with a code, such as 100, the number assigned to FW_PUT_LOGIN. This number is agreed upon between the workstation and the Fraud Data Server. The number is used by the workstation manager to determine what type of request the packet contains.
- The remaining fields in the header are populated with the appropriate values for use with the LOGIN packet.
- The user name and password fields in the packet are populated from the values extracted from the Login Window.

At the conclusion of packet building step 40, the workstation transmits the packet to the FDS by conventional protocol TCP/IP, during step 42.

During step 44, the Distro Server process on the FDS receives the packet, checks for validity, and forwards the message to the workstation manager process. During step 46, the workstation manager inspects the FW_Func field in the packet header to determine what steps to take to service the request. In this example, the workstation manager itself processes the request. Depending on the value in the FW_Func field, i.e., what is being requested, the workstation manager may process the request or forward the request on to another manager that performs a more specific function to service the request.

During step 46, if the workstation manager determines the request in the FW_Func field is invalid, a response packet is created, during step 48. The response packet contains a message having the following characteristics:

- The same FW_Ident is copied from the original request to assure the same workstation will receive the response.
- The FW_Func value is unchanged.
- A field within the packet is created called FW_STATUS and contains the textual explanation of the error.
- The packet is sent back to the workstation via the Distro Server, as indicated in step 50.

Step 52 of the process indicates that the workstation displays an appropriate error message and the process flow stops, as shown in step 54. If the workstation manager determines that the login request is to be processed, the process branches to step 56 wherein the user name and password are extracted from the request packet. Next, in step 58, the user name is searched in the account database (Sybase) 36, as shown in FIG. 7. A decisional step 60 then follows wherein the user name and password are reviewed for a match. If the user name is not found, the workstation manager generates an error response packet (in step 62) in the same manner as previously explained in connection with step 48. Step 64 then indicates the transmission of the packet to the Distro Server 28 and then to the workstation 12 where an error is displayed, as indicated in step 66. The process would then stop, as shown by step 68.

On the other hand, if the user name is found, the password from the workstation is compared to the database version and a match occurs. The result will be the building of a response packet indicating success, as shown at step 70. The header portion of the packet message copies the FW_Ident (see the table above) from the original request. Further, the header portion FW_Func has its original function code inverted, indicating that the function was successfully implemented. Additional account information is added to the response packet.

As indicated by step 72, the packet is then sent to the Distro Server 28 and then to a workstation 12. The workstation continues processing the login actions once the response of success is received, otherwise, if an error was returned, the error is displayed to the user. This is indicated by step 74. Once a response packet is received, the FW_Ident number is decremented and the number is reused for a later request. During the processing of the request on the Fraud Data Server, the workstation is monitoring a time-out value assigned to the FW_Ident. If the time-out period expires, i.e., the FDS did not respond in time, the failed request is logged and the entry is erased. If a response does appear later, the response is logged and ignored. The completion of the login procedure ends with step 76, shown in FIG. 8.

A second example of the present invention will now be discussed in connection with the process flow diagram of FIG. 9—dealing with the request for alarm details processed by the alarm manager 34 in FIG. 7. Referring to FIG. 9, a fraud alarm analyst, at a workstation, is presented with a prioritized alarm list. The analyst selects an alarm from the list, typically by clicking on the alarm item with a mouse. This initiates the request for alarm detail, as indicated in step 78. Next, as indicated by step 80, the workstation builds an alarm request packet in accordance with the message configuration discussed in connection with the table above. The request packet is characterized by the following items:

- The FW_Ident field in the header is populated with the next available communications identifier. This number is incremented to assure the next number is unique.
- The FW_Func field in the header is populated with a code, such as 1050, the number assigned to FW_GET_ALARM_DETAIL. This number is agreed upon between the workstation and the fraud data server. The number is used by the workstation manager to determine what type of request the packet contains.
- The remaining fields in the header are populated with the appropriate values for use with the alarm detail request packet.
- the alarm ID field in the packet is populated from the values extracted from the user double click.

In step 82, the workstation transmits tile packet to the FDS 16 via the conventional protocol TCP/IP. In step 84, the Distro Server process on the FDS receives the packet, checks for validity, and forwards the message to the workstation manager process 32. The workstation manager inspects the FW_Func field in the packet header to determine what steps to take to service the request. In this example, the workstation manager itself cannot process the request. Depending on the value in the FW_Func field, i.e., what is being requested, the workstation manager may process the request or forward the request on to a manager performing a more specific function to service the request. This is indicated by decisional step 86.

If the workstation manager determines the request in the FW_Func field is invalid, a response packet is created at step 88. The following characterizes the message of the packet:

- The same FW_Ident is copied from the original request to assure the same workstation will receive the response.
- The FW_Func value is unchanged.

A field within the packet is created called FW_STATUS and contains the textual explanation of the error.

The packet is then sent back to the workstation, via the Distro Server, as indicated in step 90. The workstation displays an error message or default processing message, as indicated in step 92. This is followed by an end of the process.

If, during decisional step 86, the alarm detail request is to be routed to the alarm manager 34 (FIG. 7), the alarm manager must determine which function within its subsystem will process the request since the alarm manager processes several types of requests. Once the correct functional area is determined, the processing includes an extraction of the alarm ID from the request packet, as indicated by step 96. The Sybase database 36 is accessed during step 96 to be certain that the alarm ID is recognizable by the system. If the alarm ID is not found, an error response packet is generated in the same manner as discussed in connection with step 88. In such an error scenario, steps 92 and 94 follow. However, if the alarm ID is found, the entire alarm record from the database is extracted and a packet is created indicating a successful retrieval. During this time, FW_Ident is copied from the original request. Further, the function code FW_Func is inverted to indicate a successful function retrieval. All of the alarm detail fields are copied into the packet. This is indicated in steps 98 and 102. After the response packet is created and sent, several other actions are taken. These include the updating of an alarm resolution database (step 100), this latter-identified database being incorporated within the Sybase database 36.

The purpose of the database is to maintain a history of the alarm, including call detail records (CDRs). This updated history then becomes available during succeeding review of alarm conditions. The alarm database is also updated to reflect a new user is processing the alarm.

Step 104 indicates the transmission of the packet to the Distro Server and then to the workstation. During step 106, the workstation displays the entire alarm detail. The process stops at step 108.

Once a response packet is received, the FW_Ident number is decremented and the number is reused for a later request. During the processing of the request on the FDS, the workstation is monitoring a time-out value assigned to the FW_Ident. If the time-out period expires, i.e., the FDS did not respond in time, the failed request is logged and the entry is erased. If a response does appear later, the response is logged and ignored.

Thus, from the previous description of the invention, we appreciated that a workstation-data server message-based interface is available for efficient fraud monitoring in telephone networks.

It should be understood that the invention is not limited to the exact details of construction shown and described herein for obvious modifications will occur to persons skilled in the art.

We claim:

1. A method for monitoring and detecting network fraud at a plurality of workstations, comprising the steps:

displaying a list of detected alarms at a workstation;

sensing a workstation request for details regarding a displayed alarm;

creating a message packet at the workstation, the packet including header fields that respectively—
   a. uniquely identify the occurrence order of the request;
   b. identify the alarm for which details are requested;
   c. identify the type of request being made;
   d. identify the workstation making the request;

transmitting the message packet to a distribution server for checking format validity of the packet;

forwarding a validated packet to a workstation manager for checking the type of request;

routing the packet to an alarm manager that interfaces with a database containing the alarm detailed data being requested;

extracting the alarm identification at the alarm manager from the packet header;

looking up the alarm data, in the database, that corresponds to the alarm identification in the packet header;

creating a response packet at the alarm manager that includes the alarm data retrieved from the database;

sending the response packet to the distribution server;

identifying the workstation, having made the request, to receive the response packet;

routing the response packet to the identified workstation;

extracting the alarm data from the response packet at the workstation; and displaying the alarm data at the workstation.

2. The method set forth in claim 1 together with the step of detecting an invalid request packet at the workstation manager;

creating an error packet at the workstation manager;

transmitting the error packet to the distribution server for determining which workstation is to receive the error packet; and routing the error packet to the workstation for display of a corresponding error message.

3. The method set forth in claim 1 together with the step, at the alarm manager, of adding the identification of the requesting workstation to the details of the data stored in the database, relative to the specific alarm for which details were requested by the workstation.

4. The method set forth in claim 1 together with the step of adding a record to the database to indicate an occurrence of activity concerning the alarm detail request.

5. The method set forth in claim 1 together with a preliminary process of requesting login by the workstation, comprising the steps:

displaying an icon for selecting workstation login;

creating a login request message packet at the workstation, the packet having header fields including:
   (a) user name and password;
   (b) an identification of the type of request being made, namely login; and
   (c) workstation identification;

sending the login request packet to the distribution server for checking format validity of the packet;

forwarding a valid login request packet to the workstation manager for checking the type of request being processed;

extracting user name and password from the login request packet;

comparing the extracted user name and password with corresponding data in the database to detect a match therebetween;

creating a response packet indicating a successful login match, if so detected;

sending the login response packet to the distribution server;

detecting the identification of the workstation to receive the login response packet;

forwarding the login response packet to the identified workstation; and enabling the workstation to proceed with a request for details of an alarm.

6. The method set forth in claim 5 further comprising the steps of:

detecting the failure of a match of login user name and password with that stored in the database;

creating a response packet indicating a failed login match;

transmitting the failed login response packet to the distribution server;

identifying the workstation to receive the failed login request packet;

forwarding the failed login packet to the identified workstation; and displaying an error message indicative of the login failure.

7. A system for monitoring telephone fraud occurring on a telephone network, comprising:

a plurality of computer workstations;

a fraud data server for communicating data with the workstations; the fraud data server including—
 (a) a distribution server means for distributing transmissions received from the workstations to respective data managers of the fraud data server;
 (b) shared memory means located between the workstations and the data managers;
 (c) a database connected between the workstation manager and the data managers;

each workstation including means for displaying a list of fraud alarms for which details may be requested by the workstation, the workstation further having means for creating an alarm request message packet including a plurality of fields in a header portion of the packet including—
 (d) a communication request identification field that uniquely identifies each request of a workstation;
 (e) an alarm identification field that identifies the particular alarm for which details are requested:
 (f) an alarm function identification field that is recognized by the workstation manager to determine what type of request the packet contains;

means for transmitting the packet from the workstation to the distribution server in accordance with a preselected communication protocol, the distribution server verifying proper format of the packet;

means for transmitting the packet from the distribution server to the workstation manager that inspects the alarm function field to determine what steps are to be taken to service the request;

means for transmitting the packet from the workstation manager to another manager, if the function field indicates another manager is to service the request associated with the function field, which occurs when the request is for alarm detail data, the manager servicing the request extracting the alarm identification for corresponding database look up;

means connected between the database and the workstation manager for filling alarm detail fields of a response message packet with corresponding alarm records extracted from the database; and means for transmitting the response packet to the workstation, via the distribution server to display the requested alarm details.

* * * * *